(12) United States Patent
Lazzarini et al.

(10) Patent No.: US 12,048,312 B2
(45) Date of Patent: Jul. 30, 2024

(54) MACHINE FOR PROCESSING LIQUID OR SEMI-LIQUID FOOD PRODUCTS AND METHOD FOR FOOD PROCESSING A BASE FOOD MIXTURE IN SAID MACHINE

(71) Applicant: ALI GROUP S.R.L.—CARPIGIANI, Cernusco Sul Naviglio (IT)

(72) Inventors: Roberto Lazzarini, Reggio Emilia (IT); Federico Tassi, Bologna (IT)

(73) Assignee: ALI GROUP S.R.L.—CARPIGIANI, Cernusco Sul Naviglio (IT)

( * ) Notice: Subject to any disclaimer, the term of this patent is extended or adjusted under 35 U.S.C. 154(b) by 116 days.

(21) Appl. No.: 17/838,056

(22) Filed: Jun. 10, 2022

(65) Prior Publication Data
US 2022/0394996 A1 Dec. 15, 2022

(30) Foreign Application Priority Data

Jun. 11, 2021 (IT) .................. 102021000015389

(51) Int. Cl.
*A23G 9/12* (2006.01)
*A23G 9/22* (2006.01)
*F25B 39/02* (2006.01)
*F25B 49/02* (2006.01)

(52) U.S. Cl.
CPC .............. *A23G 9/12* (2013.01); *A23G 9/225* (2013.01); *F25B 39/02* (2013.01); *F25B 49/02* (2013.01); *F25B 2700/21* (2013.01)

(58) Field of Classification Search
CPC .......... A23G 9/12; A23G 9/225; F25B 39/02; F25B 49/02; F25B 2700/21
See application file for complete search history.

(56) References Cited

U.S. PATENT DOCUMENTS 10,952,456 B2   3/2021   Cocchi et al.
2017/0105427 A1  4/2017   Cocchi et al.

FOREIGN PATENT DOCUMENTS

| CN | 112178867 A | * | 1/2021 |
| EP | 3360421 A1 | | 8/2018 |
| IT | UB20150731 A1 | | 11/2016 |

(Continued)

OTHER PUBLICATIONS

Kishimoto, Water Cooling Heat Accumulation Type Beverage Cooling Device, Jun. 8, 1993, JPH05141832A, Whole Document (Year: 1993).*

(Continued)

*Primary Examiner* — Larry L Furdge
(74) *Attorney, Agent, or Firm* — SHUTTLEWORTH & INGERSOLL, PLC; Timothy J. Klima (57) ABSTRACT

A machine for processing liquid or semi-liquid food products, including: a container holding the product and a dispenser. A stirrer, located inside the container, rotates about an axis to mix the product. An actuator is connected to the stirrer to rotate the stirrer. A refrigeration system, includes a closed circuit to circulate a primary heat exchanger fluid, an evaporator associated with the container, a compressor, a first air condenser and a throttle element; a control unit; a second condenser regulator for regulating the flow of the fluid and operating on the first and/or second condenser. The control unit drives the regulator to regulate the flow of fluid in the first and second condensers as a function of an operating parameter of the machine.

13 Claims, 6 Drawing Sheets

(56) References Cited

FOREIGN PATENT DOCUMENTS

JP           H05141832  A   *   6/1993
JP           2007170683 A   *   7/2007

OTHER PUBLICATIONS

Akiyama et al., Air Conditioner, Jul. 5, 2007, JP2007170683A, Whole Document (Year: 2007).*
Chen et al., Refrigerating System of Air Conditioner . . . , Jan. 5, 2021, CN112178867A, Whole Document (Year: 2021).*
Italian Search Report dated Apr. 21, 2022 from counterpart Italian App No. IT 202100015389.

* cited by examiner

MACHINE FOR PROCESSING LIQUID OR SEMI-LIQUID FOOD PRODUCTS AND METHOD FOR FOOD PROCESSING A BASE FOOD MIXTURE IN SAID MACHINE

This application claims priority to Italian Patent Application IT102021000015389 filed Jun. 11, 2021, the entirety of which is incorporated by reference herein.

BACKGROUND OF THE INVENTION

This invention relates to a machine for processing liquid or semi-liquid food products, in particular a machine for the thermal treatment of the products, and a method for food processing a base food mixture in said machine.

More specifically, this invention relates to an apparatus such as a batch freezer, a pasteurizer, a crushed-ice drink maker, etc.

SUMMARY OF THE INVENTION

Said machines comprise a product containing element in which the product is contained and stirred with a stirrer. These machines also comprise a refrigeration system integrated in the machine to allow thermally processing the product to be dispensed.

There are prior art refrigeration systems in which a heat exchanger fluid circulates. Generally speaking, the refrigeration system comprises a compressor, which increases the pressure of the heat exchanger fluid, a heat exchanger, which draws heat from the heat exchanger fluid, exchanging it with the outside environment, an element for reducing the pressure (for example, a throttle valve) which reduces the pressure of the heat exchanger fluid and an evaporator which draws heat from the product to be dispensed to transfer it to the heat exchanger fluid.

The cooling capacity of the refrigeration system is influenced by the temperature of the ambient surroundings.

If the outside ambient temperature is high, the heat exchanger would be able to exchange a reduced quantity of heat with the outside environment at the evaporator.

The refrigeration systems generally comprise a fan or a turbine with the heat exchanger in order to cool it. The heat exchangers made in this way are referred to as air condensers.

The fan (or turbine) in the air condensers guarantees the operation of the machine, allowing the heat exchange between the heat exchanger fluid and the air.

However, the air condensers may have several drawbacks linked especially with high temperature conditions of the outside environment.

In effect, in the case of a high temperature of the outside environment, the fans of the air condensers must operate at higher speeds to allow an adequate heat exchange of the heat exchanger fluid with the outside environment and can therefore be very noisy.

A further drawback is represented by the heat released by the air condenser into the room where the cooling machine is situated.

The main drawback caused by the high temperatures of the outside environment, if air condensers are used, is a significant reduction in the performance of the refrigeration unit.

The aim of the invention is to provide a machine for processing liquid and semi-liquid food products which overcomes the above-mentioned drawbacks of the prior art and a method for food processing in said machine.

More specifically, the aim of this disclosure is to provide a machine for processing liquid and semi-liquid food products which is capable of functioning efficiently under all ambient conditions.

BRIEF DESCRIPTION OF THE DRAWINGS

The technical features of the invention, with reference to the above-mentioned aims, are clearly described in the claims below and its advantages are more apparent from the detailed description which follows, with reference to the accompanying drawings which illustrate a preferred non-limiting example embodiment of the invention:

DESCRIPTION OF THE PREFERRED EMBODIMENTS

With reference to the accompanying drawings, the numeral 1 denotes a machine for making and dispensing liquid or semi-liquid food products according to this invention.

The machine 1 may allow the production of different types of liquid or semi-liquid products, such as, for example, ice creams, sorbets, yogurts, custards, etc.

The machine 1 comprises:
- a container 2 holding the product to be dispensed and provided with a dispenser 3 for the product;
- a stirrer 4, located inside the container 2, which rotates about a mixing axis A to mix the product to be dispensed;
- an actuator 5 connected to the stirrer 4 to set the stirrer 4 in rotation about the mixing axis A;
- a refrigeration system 100, comprising: a closed circuit (101) configured to circulate a primary heat exchanger fluid, an evaporator (102) associated with the container (2), a compressor (103), at least one first air condenser (104) and a throttle element (105) (defined by at least one valve or at least one narrow portion of the circuit configured for generating head losses in the primary heat exchanger fluid reducing the pressure).

The primary heat exchanger fluid passes through the closed circuit 101 in the following order: the evaporator 102, the compressor 103; the at least one first air condenser 104 and the throttle element 105.

The machine 1 further comprises a control unit U.

The refrigeration system 100 of the machine 1 further comprises, according to the invention:
at least a second condenser 106, located downstream of the compressor 103;

means 107 for regulating the flow, in other words, the flow rate, of the primary heat exchanger fluid, operating on the first condenser 104 and/or on the second condenser 106, for regulating a flow of the fluid respectively in the first condenser 104 and/or in the second condenser 106.

Also according to the invention, the control unit U is configured to drive the regulating means 107 in such a way as to regulate the flow of primary heat exchanger fluid in the first and in the second condenser 104, 106 as a function of an operating parameter O of the machine 1.

The regulating means 107 are shown in FIGS. 1, 2, 3, 4 with a "butterfly" symbol and in FIGS. 5, 6, 7, 8 with a small circle.

It should be noted that inside the closed circuit 101 the primary heat exchanger fluid passes in succession: the evaporator 102, the compressor 103; the at least one first air condenser 104 and the throttle element 105. According to this direction of circulation, the expression "upstream" means everything that precedes, in the circuit, a predetermined point/element; the expression "downstream" means all that follows, in the circuit, a predetermined point/element.

It should be noted that the expression "regulating means" is used to mean elements which allow the flow of the primary heat exchanger fluid to be varied (continuously, discretely, or of the ON-OFF type, that is, between two end values of zero flow and maximum flow).

According to an embodiment, the regulating means 107 are located upstream of the first condenser 104.

According to another embodiment, the regulating means 107 are located downstream of the first condenser 104.

According to an embodiment, the regulating means 107 are located upstream of the first condenser 106.

According to another embodiment, the regulating means 107 are located downstream of the second condenser 106.

According to a particular embodiment, the regulating means 107 are located upstream of both the first condenser 104 and the second condenser 106.

According to another particular embodiment, the regulating means 107 are located downstream of both the first condenser 104 and the second condenser 106.

According to an embodiment, the regulating means 107 comprise at least one two-way valve.

According to another embodiment, the regulating means 107 comprise at least one three-way valve.

Advantageously, the regulating means 107 make it possible to operate the refrigeration system 100 in three different ways:
the flow of the primary heat exchanger fluid flows only inside the first condenser 104;
the flow of the primary heat exchanger fluid flows only inside the second condenser 106;
the flow of the primary heat exchanger fluid flows choked (simultaneously) inside both the first condenser 104 and the second condenser 106.

According to a preferred embodiment, the evaporator 102 is operatively coupled to the container 2, thus allowing heat to be exchanged between the primary heat exchanger fluid and the product being processed inside the container 2.

According to an embodiment, the evaporator 102 and the containing element 2 have a partition wall 12 in common. In particular, the partition wall 12 has a surface in contact with the primary heat exchanger fluid and a further surface in contact with the product to be dispensed.

According to this configuration, the walls of the container 2, since they are closest to the evaporator 102, are subject to possible formation of ice.

Preferably, the stirrer 4 has blades designed to prevent formation of ice on the inside surface of the container 2; in effect, during rotation of the stirrer 4, the blades are designed to scrape the inside surface of the container 2.

According to another embodiment, the stirrer 4 is a screw feeder.

According to an embodiment, the first air condenser 104 comprises a fan 9.

The first condenser 104 also comprises a finned structure, coupled to the closed circuit 101, designed to allow the heat exchange surface between the primary heat exchanger fluid and the surrounding air to be increased.

The fan 9 is rotated by an electric motor (not illustrated).

The purpose of the fan 9 is to cool the primary heat exchanger fluid which passes through the first condenser 104 allowing said primary heat exchanger fluid to increase the quantity of heat exchanged with the environment.

The refrigeration system 100 of the machine 1 comprises a second condenser 106 operating with a secondary heat exchanger fluid (for example, water or a mixture of water). This type of condenser allows the heat exchange to occur between primary heat exchanger fluid and secondary heat exchanger fluid. The heat exchange between the primary heat exchanger fluid and the secondary heat exchanger fluid occurs without direct contact between the two since they flow inside separate circuits. In particular, the primary heat exchanger fluid and the secondary heat exchanger fluid may be in the same current or counter-current.

According to an embodiment, the second condenser 106 is a plate heat exchanger.

According to another embodiment, the second condenser 106 is a shell heat exchanger.

According to an embodiment, the second condenser 106 is a concentric tube heat exchanger.

The secondary heat exchanger fluid used in the second condenser 106 may flow in a secondary circuit 201 (illustrated in FIG. 4) so as to be recirculated and cooled to continue to be able to exchange heat with the primary heat exchanger fluid of the closed circuit 101. In particular, for this purpose, the second condenser 106 may be coupled to at least one cooling tower 202 (with natural circulation or forced circulation, that is to say, provided with fans to favor the heat exchange between the secondary heat exchanger fluid and the surrounding air).

Advantageously, the use of a condenser operating with a secondary heat exchanger fluid guarantees a better thermodynamic efficiency with respect to only use of an air condenser.

Moreover, advantageously, use of a second condenser 106 operating with a secondary heat exchanger fluid significantly reduces the noise due to the fan of the air condensers, especially when the fan operates in overload conditions.

Preferably, the control unit U is connected (to command and/or control) with one or more of the following components of the machine 1:
Actuator 5;
Stirrer 4;
Dispenser 3;
Closed circuit 101 of the refrigeration system 100;
A compressor 103;
Laminating element 105;
Fan 9 of the first air condenser 104;
Regulating means 107.

The control unit U is programmed to generate, receive and process control signals.

The control unit U is programmed to generate drive signals as a function of the control signals.

The control unit U is programmed to send said control signals to the components of the machine 1 to which the control unit U is connected and which is designed to control.

Describing in more detail the control mode of the machine 1, it should be noted that the control unit U is configured to rotate the stirrer 4 about the mixing axis A by controlling the actuator 5. According to a preferred embodiment, the actuator 5 is an electric motor.

The control unit U is configured to drive the regulating means 107 in such a way as to regulate the flow of primary heat exchanger fluid in the first and in the second condenser 104, 106 as a function of an operating parameter O of the machine 1.

In particular, the expression "operating parameter" is used to mean any machine state or operating parameter which can be associated with processing (for example a parameter relating to the state of components, ingredients and/or products).

Preferably, the operating parameter is a parameter relating to the state of the ingredients and/or of the products or, alternatively, a parameter relating to the state of the refrigeration system (preferably the state of the primary heat exchanger fluid at one or more points of the system). The control unit U allows, depending on the operating parameter O, the control of the machine 1 in an optimum manner.

The control unit U may, according to an aspect, be configured for regulating the speed of rotation of the fan 9 of the first air condenser 104 as a function of the operating parameter O.

Regulating the speed of rotation of the fan of an air condenser guarantees the optimum operation of the air condenser.

In an embodiment, the control unit U is configured to drive the regulating means 107 in such a way as to allow the primary heat exchanger fluid to flow in the first condenser 104 and/or in the second condenser 106 as a function of the type of product.

In one embodiment, the machine 1 comprises a user interface 16.

According to an embodiment, the user interface 16 is connected to the control unit U to allow a user to enter the value of the operating parameter O (relating to the state of components, ingredients and/or products).

According to an embodiment, the user interface 16 connected to the control unit U allows the type of product to be inserted so as to consequently regulate the regulating means 107.

The machine 1, according to an embodiment, comprises at least one sensor 6 by means of which it is able to measure the operating parameter O.

Advantageously, detecting the operating parameter O by means of the sensor 6 makes it possible to keep the machine 1 monitored.

Another advantage of detecting the operating parameter O by means of the sensor 6 is that of making the control of the machine 1 automated.

The operating parameter O detected by the sensor 6 may be:
the temperature of the primary heat exchanger fluid upstream of the throttle element 105, and/or
the ambient temperature, and/or
the temperature of the product, and/or
the temperature of the primary heat exchanger fluid downstream of the compressor 103, and/or
the temperature of the primary heat exchanger fluid upstream of the evaporator 102, and/or
the temperature of the primary heat exchanger fluid downstream of the evaporator 102, and/or
the pressure of the primary heat exchanger fluid upstream of the throttle element 105, and/or
the pressure of the primary heat exchanger fluid downstream of the compressor 103, and/or
the pressure of the primary heat exchanger fluid upstream of the evaporator 102, and/or
the pressure of the primary heat exchanger fluid downstream of the evaporator 102.

According to an embodiment, the machine 1 comprises at least two sensors 6 designed to measure different operating parameters 0.

According to one aspect, the control unit U is configured to drive the regulating means 107 in such a way as to allow the primary heat exchanger fluid to flow only in the first condenser 104 if the temperature or the pressure detected by the sensor 6 is less than a first predetermined value.

Preferably, if the first predetermined value is a temperature value, the first predetermined value is between 25° C. and 35° C.

Still more preferably, if the first predetermined value is a temperature value, the first predetermined value is between 27.5° C. and 32.5° C. (preferably 30° C.).

Advantageously, activating only the first condenser 104 if the temperature or the pressure detected is less than the first predetermined value guarantees that the refrigeration to operate in an optimum manner. Advantageously, for these temperature and/or pressure values the first condenser 104 has a lower energy consumption than the second condenser 106.

According to an aspect, the control unit U is configured to drive the regulating means 107 in such a way as to allow the primary heat exchanger fluid to flow only in the first condenser 106 if the temperature or the pressure detected by the sensor 6 is less than a first predetermined value.

Preferably, if the second predetermined value is a temperature value, the second predetermined value is between 35° C. and 45° C.

Still more preferably, if the second predetermined value is a temperature value, the second predetermined value is between 37.5° C. and 42.5° C. (preferably 40° C.).

Advantageously, activating only the second condenser 106 if the temperature detected is greater than the second predetermined value guarantees that the refrigeration system operates in an optimum manner, because the second condenser 106, having a thermal efficiency greater than that of the first condenser 104, allows a more efficient heat exchange in these conditions.

According to an aspect, the control unit U is configured to drive the regulating means 107, so as to choke (that is, subdivide) the primary heat exchanger fluid in the first condenser 104 and in the second condenser 106 if the temperature detected by the sensor 6 is greater than or equal to the first predetermined value and less than or equal to the second predetermined value.

Preferably, the choking is a function of the temperature: in effect, if the temperature detected by the sensor 6 is greater than or equal to the first predetermined value and less than or equal to the second predetermined value, the control unit U is configured to control the regulating means 107, so as to choke (that is, divide) the flow of primary heat exchanger fluid in the first condenser 104 and in the second condenser 106 according to a proportion equal to a difference between the temperature/pressure value detected by the sensor 6 and the first predetermined temperature/pressure value divided by the difference between the second and the first predetermined temperature/pressure value.

In other words, following said criterion, if the temperature is close to the first predetermined value the choking of the heat exchanger fluid means that a greater quantity of fluid flows in the first condenser; Vice versa, if the temperature/pressure is close to the second predetermined value the choking of the heat exchanger fluid means that a greater quantity of fluid flows into the second condenser 106. According to an aspect, the regulating means 107 allow a flow of primary heat exchanger fluid entering the second condenser 106 proportional to the temperature or pressure detected by the sensor 6.

Advantageously, simultaneously activating the first condenser 104 and the second condenser 106 if the temperature or the pressure detected is greater than or equal to the first predetermined value and less than or equal to the second predetermined value, guarantees that the refrigeration system operates in an optimum manner, since it allows the positive aspects of both types of condenser to be used, which are optimum under the specific conditions.

With reference to the case in which the parameter detected is a pressure value at the outlet from the first and second condenser (104, 106), according to an aspect, the regulating means 107 are configured so as to regulate the flow of primary heat exchanger fluid in the first and in the second condenser (104, 106) as a function of the pressure value detected as follows:

if the pressure value detected is greater than or equal to a first predetermined pressure value, activating the second condenser 106 (allowing the circulation of heat exchanger fluid in the leg of the relative circuit);

if the pressure value detected is less than or equal to a second predetermined pressure value (with the second pressure value less than the first), deactivating the second condenser 106 (inhibiting the circulation of heat exchanger fluid in the leg of the relative circuit).

If the primary heat exchanger fluid is an HFO coolant such as R-452A, the first pressure value is 23 bar (2.3 MPa) and the second pressure value is 19 bar (1.9 MPa)

It should be noted that, more generally speaking, if the primary heat exchanger fluid is a different coolant from R-452A, the first and the second pressure values may be different from those indicated.

According to one aspect, the control unit U is configured to drive the regulating means 107 in such a way as to allow the primary heat exchanger fluid to flow in the first condenser 104 and/or in the second condenser 106 as a function of the type of product.

According to an embodiment, the sensor 6 detects the type of product processed by the machine 1 so as to consequently regulate the regulating means 107.

According to another embodiment, the type of product is introduced (that is, communicated to the control unit U) by means of a user interface 16.

Advantageously, regulating the flow of primary heat exchanger fluid in the first condenser 104 and/or in the second condenser 106 as a function of the type of product guarantees the optimum characteristics for the desired product are obtained; in effect, it is possible to use—in advance—actively in the refrigeration system the first condenser 104 and/or the second condenser 106 on the basis of the characteristics and specific features of the product being processed.

According to another aspect, the control unit U is configured to drive the regulating means 107 in such a way as to allow the primary heat exchanger fluid to flow in the first condenser 104 and/or in the second condenser 106 as a function of the step in the operation of the machine 1.

The expression "operating step" means the processing time and/or the type of processing being performed on the finished product. For example, the term "operating step" may mean the mixing step, the mixing and cooling step (simultaneously), etc. . . .

According to an embodiment of the refrigeration system 100 of the machine 1, the second condenser 106 is disposed parallel to the first air condenser 104.

Advantageously, the configuration in parallel of the first and second condensers 104, 106 allows the two condensers to be simultaneously activated in the presence of predetermined operating conditions and to exchange the heat necessary to guarantee the optimum operation of the refrigeration system.

According to an embodiment, the closed circuit 101 comprises a first leg 7 and a second leg 8.

According to an aspect, the first condenser 104 is positioned in the first leg 7.

According to an aspect, the second condenser 106 is positioned in the second leg 8.

According to an embodiment, the first leg 7 is positioned in parallel to the second leg 8.

According to an embodiment, the first leg 7 is positioned in series with the second leg 8.

According to an embodiment, the closed circuit 101, in the configuration in series of the leg 7 and of the leg 8, comprises a first bypass leg 10 (associated with the leg 7) which allows the primary heat exchanger fluid to pass beyond the first condenser 104 allowing the flow solely in the second condenser 106.

According to another embodiment, the closed circuit 101, in the configuration in series of the leg 7 and of the leg 8, comprises the first bypass leg 10 which allows the primary heat exchanger fluid to pass beyond the first condenser 104 and a second bypass leg 11 (associated with the leg 8) which allows the primary heat exchanger fluid to pass beyond the second condenser 106.

According to an embodiment, the closed circuit 101, in the configuration in series of the leg 7 and of the leg 8, comprises the second bypass leg 11 which allows the primary heat exchanger fluid to pass beyond the second condenser 106.

According to one aspect, the regulating means 107 comprise at least one valve which allows regulating the flow of primary heat exchanger fluid in the first condenser 104 and/or in the second condenser 106.

According to an aspect, the regulating means 107 comprise at least one two-way and/or three-way valve.

The expression "two-way valve" means a valve provided with a valve body (with an inlet and an outlet) and a shutter, the movement of which regulates the internal passageway and chokes the flow of the primary heat exchanger fluid through it.

The expression "three-way valve" means a valve provided with a valve body and a shutter which regulates the flow of the primary heat exchanger fluid inside it. These three-way valves may be partly open or closed and be provided with an inlet and two outlets or with two inlets and an outlet.

According to an embodiment (FIG. 5), considering an arrangement in series of the first leg 7 and the second leg 8, the regulating means 107 comprise a three-way valve v1 positioned upstream or downstream (not illustrated) of the first condenser 104 and a three-way valve v2 upstream or downstream (not illustrated) of the second condenser 106.

According to a further embodiment (FIG. 6), considering an arrangement in series of the first leg 7 and of the second leg 8, the regulating means 107 comprise a two-way valve v3 positioned on the first leg 7 upstream or downstream (not illustrated) of the first condenser 104, a two-way valve v4 on the first bypass leg 10, a two-way valve v5 positioned on the second leg 8 upstream or downstream (not illustrated) of the second condenser 106, a two-way valve v6 on the second bypass leg 11.

According to an embodiment (not illustrated), considering an arrangement in series of the first leg 7 and of the second leg 8, the regulating means 107 comprise a three-way valve positioned upstream or downstream of the first condenser 104, a two-way valve positioned on the second leg 8 upstream or downstream of the second condenser 106 and a two-way valve on the second bypass leg 11.

According to an embodiment (not illustrated), considering an arrangement in series of the first leg 7 and of the second leg 8, the regulating means 107 comprise a two-way valve positioned on the first leg 7 upstream or downstream of the first condenser 104, a two-way valve on the first bypass leg 10 and a three-way valve upstream or downstream of the second condenser 106.

According to an embodiment, considering an arrangement in parallel of the first leg 7 and of the second leg 8, the regulating means 107 comprise a three-way valve v1 upstream (illustrated in FIG. 7) or downstream (not illustrated) of the first and second condensers (104, 106).

According to an embodiment, considering an arrangement in parallel of the first leg 7 and of the second leg 8, the regulating means 107 comprise a two-way valve v3 on the first leg 7 and a two-way valve v5 on the second leg 8, positioned upstream (illustrated in FIG. 8) or downstream (not illustrated) of the first condenser 104 and of the second condenser 106, respectively.

Figure 1:
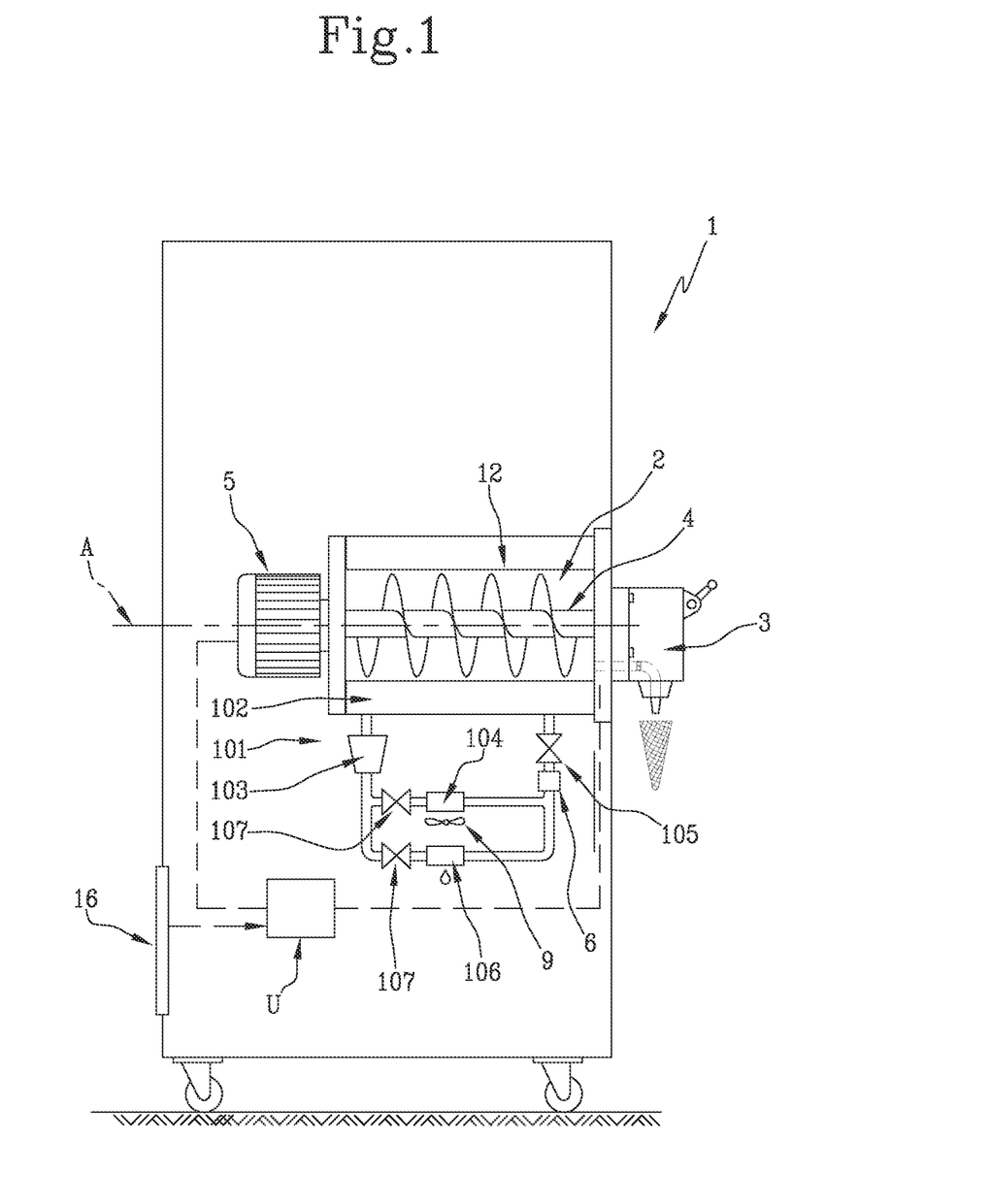
FIG. 1 illustrates an embodiment of a machine for processing liquid or semi-liquid food products, according to the invention.
Figure 2:
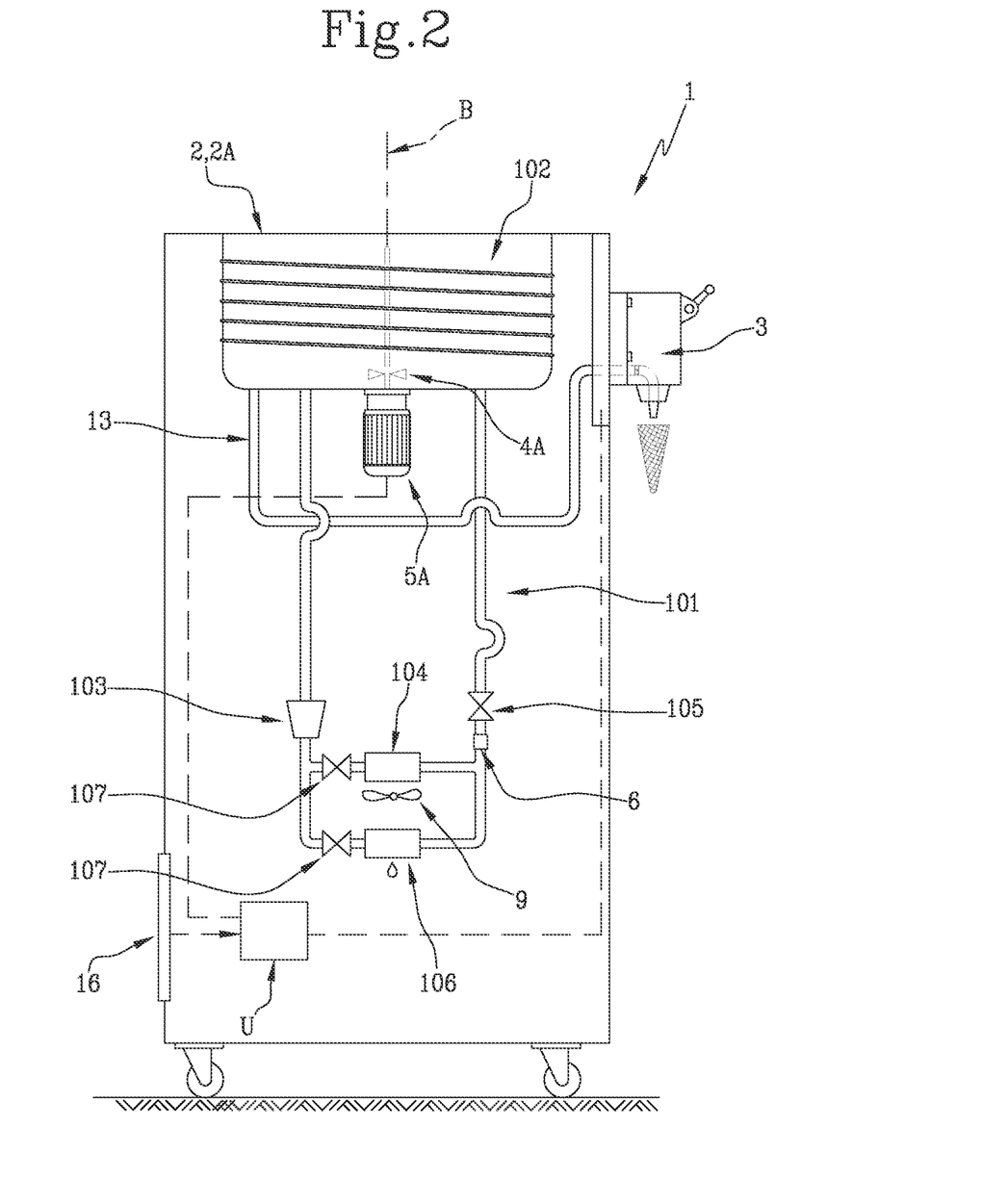
FIG. 2 illustrates another embodiment of a machine for processing liquid or semi-liquid food products.
Figure 3:
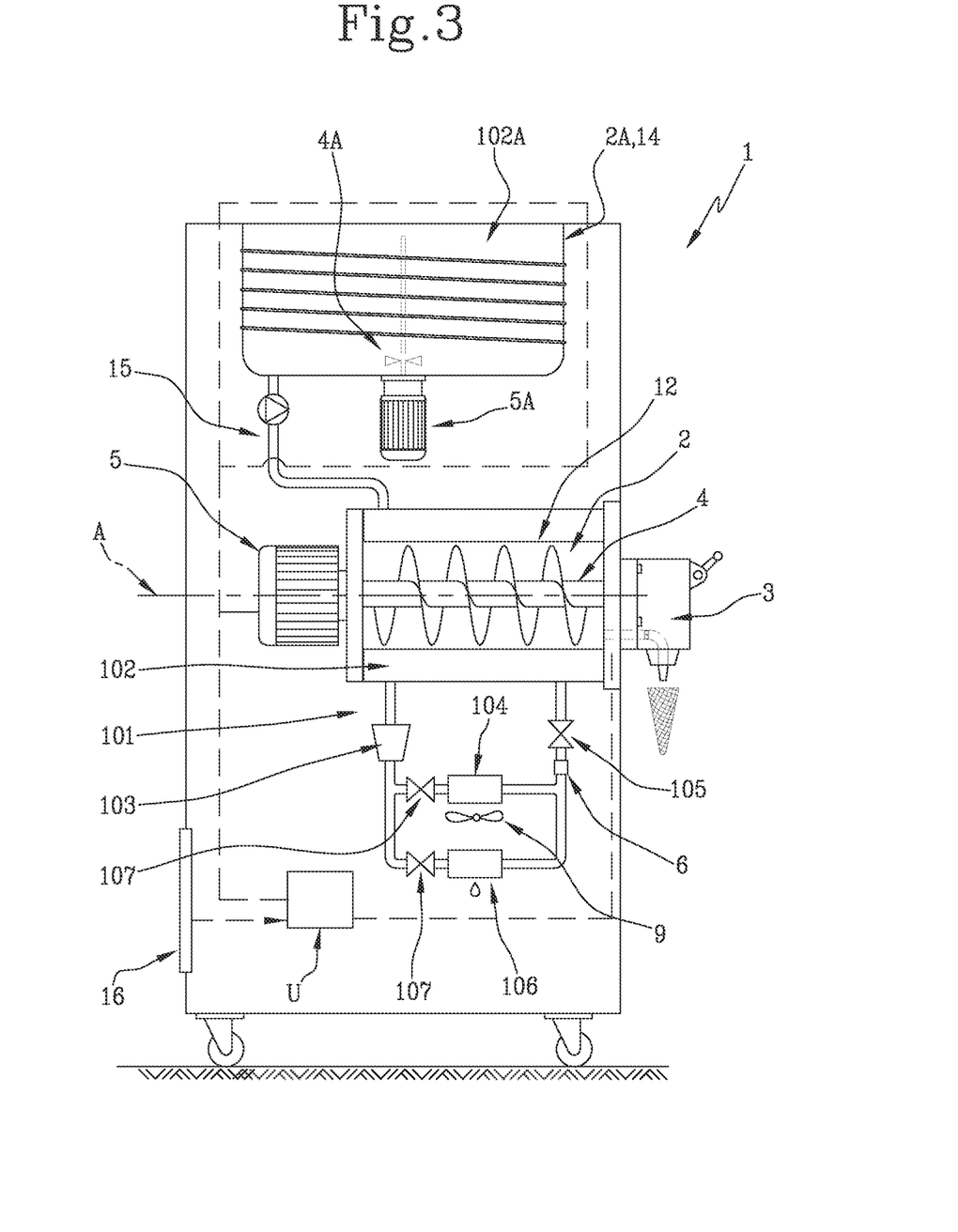
FIG. 3 illustrates a further embodiment of a machine for processing liquid or semi-liquid food products.
Figure 4:
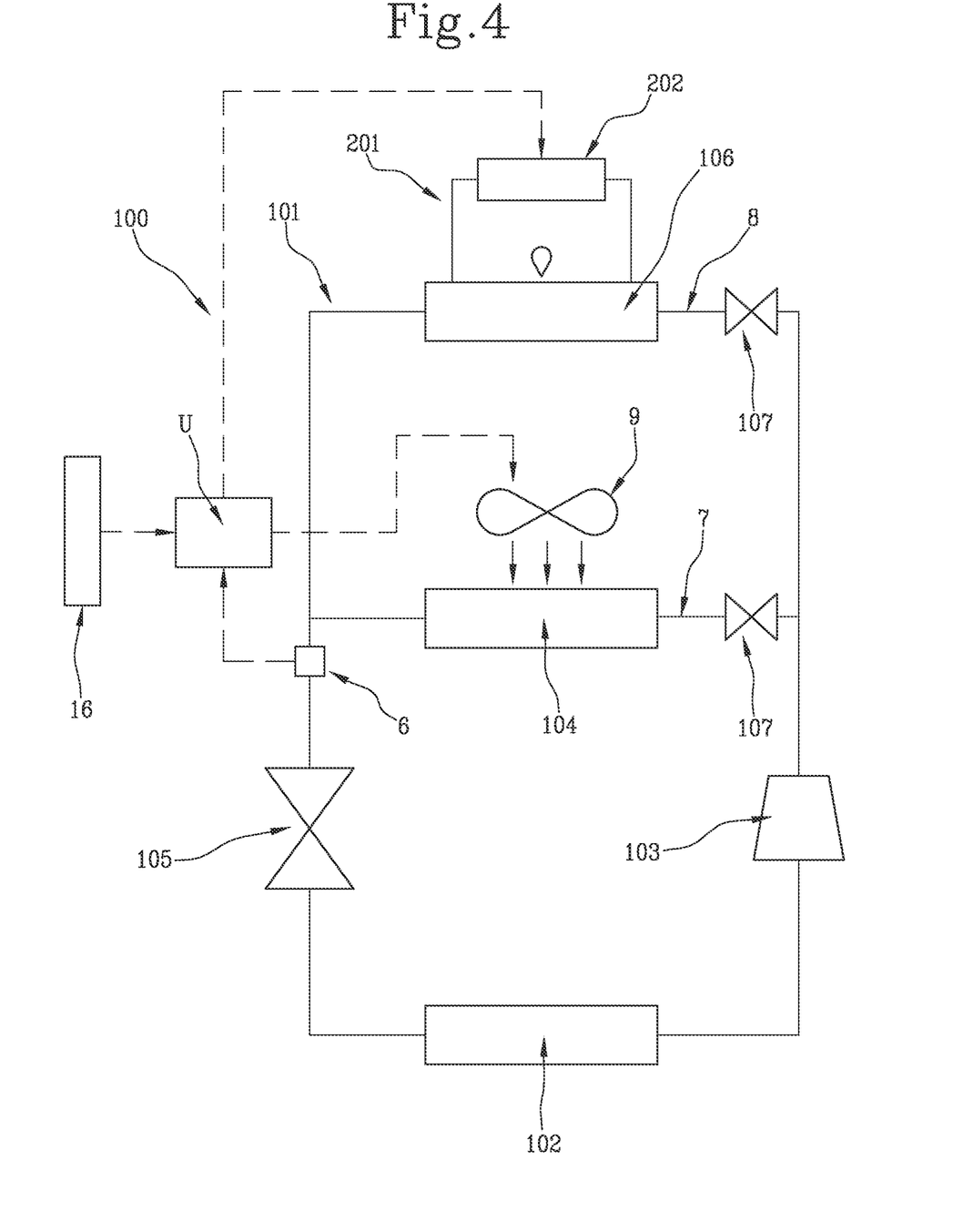
FIG. 4 illustrates a schematic view of an embodiment of the closed circuit of the refrigeration system of the machine of FIGS. 1, 2 and 3.
Figure 5:
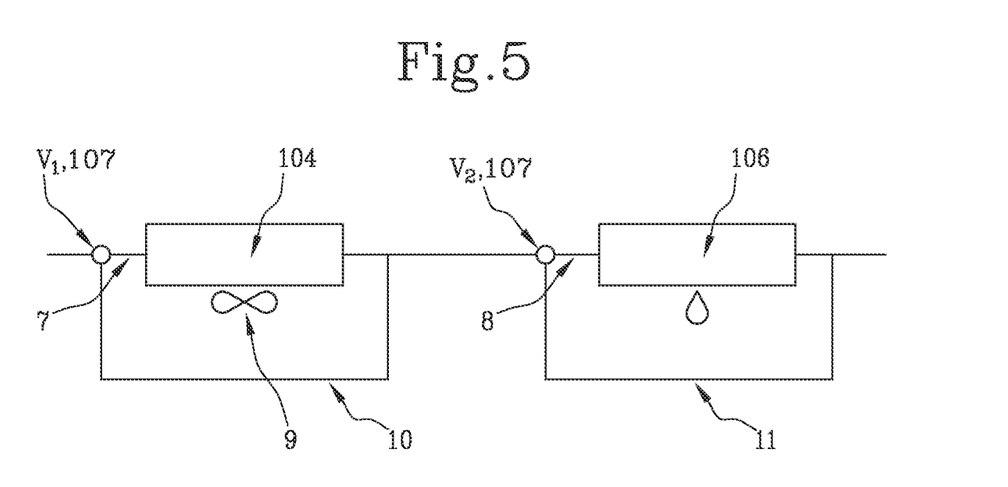
FIGS. 5 and 6 illustrate respective schematic views of different embodiments of a portion of the closed circuit with a configuration in series of the condensers.
Figure 6:
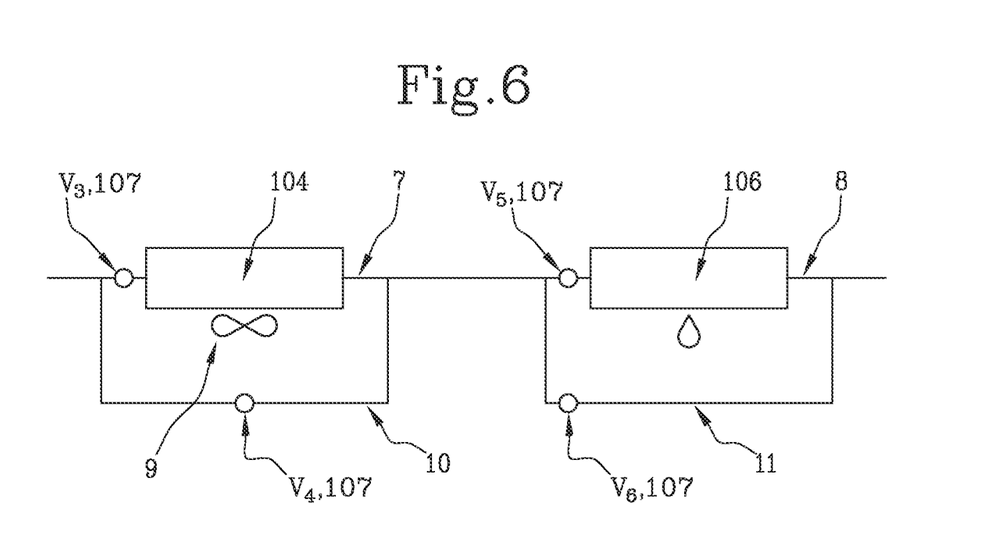
Figure 7:
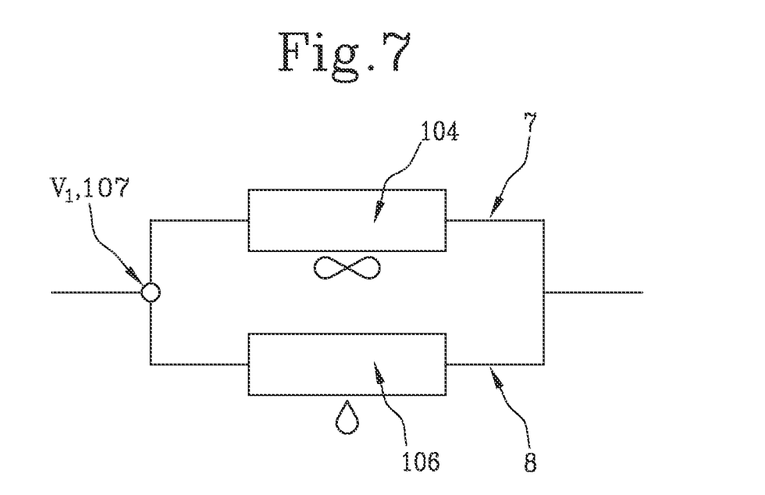
FIGS. 7 and 8 illustrate respective schematic views of different embodiments of a portion of the closed circuit illustrated in FIG. 4 with a configuration in parallel of the condensers.
Figure 8:
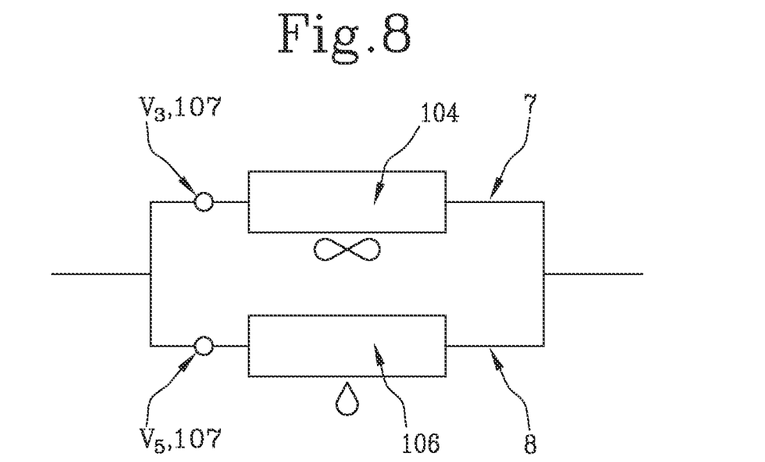

With reference in particular to FIGS. 2 and 3, according to an embodiment, the container 2 is a thermal treatment tank 2A. In this embodiment, the machine 1 comprises a dispensing duct 13. The dispensing duct 13 is configured to connect the thermal treatment tank 2A to the dispenser 3.

According to an embodiment, illustrated in FIG. 3, the machine 1 comprises a further container 14. The further container 14 is connected to the container 2 by a filling duct 15. The further container 14 is in contact with the further evaporator 102A.

In this embodiment, the machine 1 comprises a second actuator 5A. According to this embodiment, the machine 1 comprises a second stirrer 4A. The second actuator 5A is connected to the second stirrer 4A for rotating it and mixing a product contained in the further container 14. According to this embodiment, the machine 1 preferably also comprises a pump for transferring the product from the further container 14' to the container 2.

The control unit U is configured for rotating the second stirrer 4A about the further mixing axis B by controlling the second actuator 5A. According to another aspect of the invention, a method is also defined for food processing of a food mixture, in particular a pasteurizing method.

According to an aspect, the method comprises a step of preparing a base mixture.

According to an aspect, the method comprises a step of heating a base mixture (preferably inside the container 2 and/or the thermal treatment tank 2A) for a predetermined heating time. According to a first aspect, the heating occurs at 60° C. and 85° C.; preferably, said heating time is greater than or equal to 30 minutes.

According to an embodiment, the step of heating a base mixture comprises an alternating heating between the container 2 and the thermal treatment tank 2A.

According to an aspect, the method comprises a step of cooling said base mixture subjected to the rest step (preferably inside the container 2 and/or the thermal treatment tank 2A).

According to an embodiment, the base mixture is cooled to a temperature of between 2° C. and 6° C.

According to the invention, during the heating step the first heat exchanger fluid is made to flow in the second condenser 106.

According to the invention, during the step of cooling said base mixture, the first heat exchanger fluid flows in the second condenser 106.

In other words, the first heat exchanger fluid starts to flow in the second condenser 106 before the step of cooling the base mixture.

The flow of the first heat exchanger fluid inside the second condenser 106 is interrupted when the base mixture reaches the desired temperature.

Advantageously, in this way, during the more critical steps of the pasteurizing process the second condenser 106 is used, having a greater effectiveness.

According to this aspect, the regulating means 107 regulate the flow of primary heat exchanger fluid in the first and in the second condensers (104, 106) as a function of the time step of the processing.

What is claimed is:

1. A machine for processing a liquid or semi-liquid food product, comprising:
    a container configured for holding a product to be dispensed and including a dispenser for the product;
    a stirrer, located inside the container, the stirrer rotatable about a mixing axis to mix the product to be dispensed;
    an actuator connected to the stirrer to set the stirrer in rotation about the mixing axis;
    a refrigeration system, comprising: a closed circuit configured to circulate a primary heat exchanger fluid, an evaporator thermally connected with the container, a compressor, a first condenser and a throttle element, the primary heat exchanger fluid flowable along the closed circuit through the following, in succession: the evaporator, the compressor; the first condenser and the throttle element;
    a control unit;
    wherein the refrigeration system also comprises:
        a second condenser in which the primary heat exchanger fluid and a secondary heat exchanger fluid flow and which is configured to allow heat exchange between the primary heat exchanger fluid and the secondary heat exchanger fluid, the second condenser being located downstream of the compressor;
        a regulator configured for regulating the flow of the primary heat exchanger fluid and operating on at least one chosen from the first condenser and the second condenser to regulate the flow of fluid in the at least one chosen from the first condenser and the second condenser, respectively, the control unit being configured to drive the regulator to regulate the flow of primary heat exchanger fluid in the first condenser and in the second condenser as a function of an operating parameter of the machine;
    wherein the regulator comprises at least one valve which is configured to regulate the flow of primary heat exchanger fluid in the at least one chosen from the first condenser and the second condenser;

a sensor configured to detect the operating parameter of the machine;
wherein the sensor is configured to detect at least one of the following operating parameters of the machine:
a temperature of the primary heat exchanger fluid upstream of the throttle element;
an ambient temperature;
a temperature of the product;
a temperature of the primary heat exchanger fluid downstream of the compressor;
a temperature of the primary heat exchanger fluid upstream of the evaporator; and
a temperature of the primary heat exchanger fluid downstream of the evaporator;
wherein the control unit is configured to drive the regulator to allow the primary heat exchanger fluid to flow only in the second condenser if the temperature or a pressure detected by the sensor is greater than a second predetermined value.

2. The machine according to claim 1, wherein the sensor is configured to detect at least one of the following operating parameters of the machine: the pressure of the primary heat exchanger fluid upstream of the throttle element; the pressure of the primary heat exchanger fluid downstream of the compressor; the pressure of the primary heat exchanger fluid upstream of the evaporator; and the pressure of the primary heat exchanger fluid downstream of the evaporator.

3. The machine according to claim 1, wherein the control unit is configured to drive the regulator to allow the primary heat exchanger fluid to flow only in the first condenser if the temperature or a pressure detected by the sensor is less than a first predetermined value.

4. The machine according to claim 3, wherein the control unit is configured to drive the regulator to allow the primary heat exchanger fluid to flow in the first condenser and in the second condenser if the temperature or the pressure detected by the sensor is greater than or equal to the first predetermined value and if the temperature or the pressure detected by the sensor is less than or equal to the second predetermined value.

5. The machine according to claim 4, wherein the regulator is configured to allow the primary heat exchanger fluid to flow into the second condenser in proportion to the temperature or the pressure detected by the sensor.

6. The machine according to claim 1, wherein the control unit is configured to drive the regulator to allow the primary heat exchanger fluid to flow in the at least one chosen from the first condenser and the second condenser as a function of the product.

7. The machine according to claim 1, wherein the control unit is configured to drive the regulator to allow the primary heat exchanger fluid to flow in the at least one chosen from the first condenser and the second condenser as a function of a step in an operation of the machine.

8. The machine according to claim 1, wherein the second condenser is disposed parallel to the first condenser.

9. The machine according to claim 1, wherein the closed circuit comprises a first leg and a second leg, wherein the first leg is in parallel with the second leg, the first condenser being located in the first leg and the second condenser being located in the second leg.

10. The machine according to claim 1, wherein the secondary heat exchanger fluid is water or a water mixture.

11. A method for food processing a base food mixture in a machine, comprising the following steps:
providing a machine for processing a liquid or semi-liquid food product, comprising:
a container configured for holding a product to be dispensed and including a dispenser for the product;
a stirrer, located inside the container, the stirrer rotatable about a mixing axis to mix the product to be dispensed;
an actuator connected to the stirrer to set the stirrer in rotation about the mixing axis;
a refrigeration system, comprising: a closed circuit configured to circulate a primary heat exchanger fluid, an evaporator thermally connected with the container, a compressor, a first condenser and a throttle element, the primary heat exchanger fluid flowable along the closed circuit through the following, in succession: the evaporator, the compressor; the first condenser and the throttle element;
a control unit;
wherein the refrigeration system also comprises:
a second condenser in which the primary heat exchanger fluid and a secondary heat exchanger fluid flow and which is configured to allow heat exchange between the primary heat exchanger fluid and the secondary heat exchanger fluid, the second condenser being located downstream of the compressor;
a regulator configured for regulating the flow of the primary heat exchanger fluid and operating on at least one chosen from the first condenser and the second condenser to regulate the flow of fluid in the at least one chosen from the first condenser and the second condenser, respectively, the control unit being configured to drive the regulator to regulate the flow of primary heat exchanger fluid in the first condenser and in the second condenser as a function of an operating parameter of the machine;
wherein the regulator comprises at least one valve which is configured to regulate the flow of primary heat exchanger fluid in the at least one chosen from the first condenser and the second condenser;
a sensor configured to detect the operating parameter of the machine;
wherein the sensor is configured to detect at least one of the following operating parameters of the machine:
a temperature of the primary heat exchanger fluid upstream of the throttle element;
an ambient temperature;
a temperature of the product;
a temperature of the primary heat exchanger fluid downstream of the compressor;
a temperature of the primary heat exchanger fluid upstream of the evaporator; and
a temperature of the primary heat exchanger fluid downstream of the evaporator;
wherein the control unit is configured to drive the regulator to allow the primary heat exchanger fluid to flow only in the second condenser if the temperature or a pressure detected by the sensor is greater than a second predetermined value;
preparing a base mixture;
heating the base mixture;
cooling the base mixture, wherein at least the step of heating the base mixture comprises making the first heat exchanger fluid flow in the second condenser.

12. The method according to claim 11, wherein the step of cooling the base mixture also comprises making the first heat exchanger fluid flow in the second condenser.

13. A machine for processing a liquid or semi-liquid food product, comprising:
- a container configured for holding a product to be dispensed and including a dispenser for the product;
- a stirrer, located inside the container, the stirrer rotatable about a mixing axis to mix the product to be dispensed;
- an actuator connected to the stirrer to set the stirrer in rotation about the mixing axis;
- a refrigeration system, comprising: a closed circuit configured to circulate a primary heat exchanger fluid, an evaporator thermally connected with the container, a compressor, a first condenser and a throttle element, the primary heat exchanger fluid flowable along the closed circuit through the following, in succession: the evaporator, the compressor; the first condenser and the throttle element;
- a control unit;
- wherein the refrigeration system also comprises:
  - a second condenser in which the primary heat exchanger fluid and a secondary heat exchanger fluid flow and which is configured to allow heat exchange between the primary heat exchanger fluid and the secondary heat exchanger fluid, the second condenser being located downstream of the compressor;
  - a regulator configured for regulating the flow of the primary heat exchanger fluid and operating on at least one chosen from the first condenser and the second condenser to regulate the flow of fluid in the at least one chosen from the first condenser and the second condenser, respectively, the control unit being configured to drive the regulator to regulate the flow of primary heat exchanger fluid in the first condenser and in the second condenser as a function of an operating parameter of the machine;
  - wherein the regulator comprises at least one valve which is configured to regulate the flow of primary heat exchanger fluid in the at least one chosen from the first condenser and the second condenser;
- a sensor configured to detect the operating parameter of the machine;
- wherein the sensor is configured to detect at least one of the following operating parameters of the machine:
  - a temperature of the primary heat exchanger fluid upstream of the throttle element;
  - an ambient temperature;
  - a temperature of the product;
  - a temperature of the primary heat exchanger fluid downstream of the compressor;
  - a temperature of the primary heat exchanger fluid upstream of the evaporator; and
- wherein the control unit is configured to drive the regulator to allow the primary heat exchanger fluid to flow only in the first condenser if the temperature or a pressure detected by the sensor is less than a first predetermined value;
- wherein the control unit is configured to drive the regulator to allow the primary heat exchanger fluid to flow in the first condenser and in the second condenser if the temperature or the pressure detected by the sensor is greater than or equal to the first predetermined value and if the temperature or the pressure detected by the sensor is less than or equal to the second predetermined value.

* * * * *